(12) United States Patent
Eiselt et al.

(10) Patent No.: US 10,270,534 B2
(45) Date of Patent: Apr. 23, 2019

(54) METHOD AND TRANSMITTER DEVICE FOR CREATING AN OPTICAL TRANSMIT SIGNAL

(71) Applicant: ADVA Optical Networking SE, Meiningen (DE)

(72) Inventors: Michael Eiselt, Kirchheim (DE); Annika Dochhan, Meiningen (DE)

(73) Assignee: ADVA Optical Networking SE, Meiningen (DE)

( * ) Notice: Subject to any disclaimer, the term of this patent is extended or adjusted under 35 U.S.C. 154(b) by 33 days.

(21) Appl. No.: 15/453,102

(22) Filed: Mar. 8, 2017

(65) Prior Publication Data

US 2017/0264368 A1 Sep. 14, 2017

(30) Foreign Application Priority Data

Mar. 9, 2016 (EP) .................................... 16159449

(51) Int. Cl.
*H04B 10/00* (2013.01)
*H04B 10/516* (2013.01)
(Continued)

(52) U.S. Cl.
CPC ....... *H04B 10/516* (2013.01); *H04B 10/2507* (2013.01); *H04B 10/5165* (2013.01); *H04B 10/69* (2013.01); *H04B 10/697* (2013.01)

(58) Field of Classification Search
CPC ... H04B 10/516; H04B 10/69; H04B 10/5165
(Continued)

(56) References Cited

U.S. PATENT DOCUMENTS

| 2013/0142520 A1 | 6/2013 | Xie |
| 2015/0037034 A1 | 2/2015 | Renaudier et al. |

(Continued)

FOREIGN PATENT DOCUMENTS

EP 2645599 A1 10/2013

OTHER PUBLICATIONS

Chan et al.; "400-Gb/s Transmission Over 10-km SSMF Using Discrete Multitone and 1.3-um EMLs"; IEEE Photonics Technology Letters; 2014; pp. 1657-1660; vol. 26:16.
(Continued)

*Primary Examiner* — Tesfaldet Bocure
(74) *Attorney, Agent, or Firm* — The Webb Law Firm (57) ABSTRACT

A method for creating an optical transmit signal includes creating an electrical discrete multi-tone signal according to digital input data carrying the information to be transmitted, the discrete multi-tone signal having a plurality of electrical partial signals, each electrical partial signal defining a sub-channel. Each electrical partial signal includes a sub-carrier at a predetermined sub-carrier frequency which is modulated according to a dedicated modulation scheme, so that a dedicated portion of the digital input data is included in each sub-channel. The method includes creating an optical signal by using the electrical discrete multi-tone signal as modulating signal for amplitude-modulating the intensity of an optical carrier signal. The method further includes bandpass-filtering the optical signal in order to create an optical single sideband or vestigial sideband transmit signal. An optical transmitter device for creating such an optical transmit signal and to an optical transmitter and receiver device includes a respective optical transmitter device.

13 Claims, 6 Drawing Sheets

(51) Int. Cl.
*H04B 10/69* (2013.01)
*H04B 10/2507* (2013.01)

(58) Field of Classification Search
USPC .................................................. 398/140, 162
See application file for complete search history.

(56) References Cited

U.S. PATENT DOCUMENTS

| | | | |
|---|---|---|---|
| 2017/0093515 A1* | 3/2017 | Tanaka ................. | H04B 10/564 |
| 2017/0180055 A1* | 6/2017 | Yu ......................... | H04B 10/612 |
| 2017/0237485 A1* | 8/2017 | Wood ..................... | H04B 10/11 |
| | | | 398/104 |
| 2017/0250760 A1* | 8/2017 | Yu ......................... | H04B 10/616 |

OTHER PUBLICATIONS

Dochhan et al.; "Experimental Investigation of Discrete Multitone Transmission in the Presence of Optical Noise and Chromatic Dispersion"; Optical Society of America; 2014; pp. 1-3.

Dong et al.; "Four-channel Vestigial Sideband Discrete Multi-Tone Modulation Using Silicon Photonic Integrated Circuits"; Eco; 2015; pp. 1-3.

Okabe et al.; "100 Gb/s Optical Discrete Multi-tone Transceivers for Intra- and Inter-datacenter Networks"; Proc. of SPIE; 2016; pp. 1-7; vol. 9775.

* cited by examiner

METHOD AND TRANSMITTER DEVICE FOR CREATING AN OPTICAL TRANSMIT SIGNAL

CROSS-REFERENCE TO RELATED APPLICATION

This application claims priority to European Patent Application No. 16 159 449.4 filed Mar. 9, 2016, the disclosure of which is hereby incorporated in its entirety by reference.

BACKGROUND OF THE INVENTION

Field of the Invention

The invention relates to a method for creating an optical transmit signal, namely, an optical discrete multi-tone transmit signal. The invention further relates to a transmitter device as well as to a transmitter and receiver device.

Description of Related Art

Transmission of signals at high data rates (e.g. 100 Gb/s) per wavelength using intensity modulation and direct detection and discrete multi-tones (DMT) has become popular recently (see e.g. T. Chan et al., "400-Gb/s Transmission Over 10-km SSMF Using Discrete Multitone and 1.3-um EML's", IEEE Photonics Technology Letters, Vol. 26, No. 16, Aug. 15, 2014). Some module vendors start to develop transponders for optical wavelength division multiplex (WDM) systems with single-channel transmission of 100 Gb/s using this technology. However, the optical signal-to-noise ratio (OSNR) requirements for these transponders are typically in the order of 40 dB, allowing only short transmission distances over standard single-mode fibers (SSMF) or requiring high effort on the transmission line, e.g. Raman amplification, which might not be possible in some network configurations. Furthermore, chromatic fiber dispersion needs to be compensated in typical known transmission configurations.

For example, an OSNR of 40 dB at the receiver after an 80 km transmission line of standard single-mode fiber, which leads to a loss of approximately 21 to 26 dB, can only be achieved with very high transmission power of 8 to 13 dBm. Distributed Raman amplification could reduce this power by approx. 5 dB, but would still require high transmission power values.

It is known that using electrical and optical components with a wide bandwidth will result in a reduction of the required OSNR, but will also increase the component cost. Furthermore, the optical bandwidth of an optical channel signal, which is to be transmitted over an optical WDM transmission link, should be constrained to an optical bandwidth lower than the channel spacing (i.e. the grid). For example, if the WDM system uses a grid of 50 GHz, the optical channel signals must be constrained to approximately 40 GHz. Additionally, when transmitting intensity modulated double sideband (DSB) optical signals over standard single-mode fibers (SSMF) chromatic dispersion induces power fading due to a phase shift of two corresponding sideband components depending on the dispersion parameter, the fiber length and the frequencies of the optical carrier signal and the modulation signal. That is, the RF (radio frequency) power of the modulation components of the optical DSB signal, which is detected at the far end of the optical fiber (or more generally, at the far end of the optical transmission path), shows drop-outs as a function of the modulation frequency. Of course, this effect also leads to a corresponding dependency of the signal-to-noise ratio of the RF signal received. In practice, of course, the frequency responses of all components at the transmitter and receiver side additionally influence the frequency-dependency of the power of the RF signal received and thus the signal-to-noise ratio of the signal received. If an optical DMT signal is used in an optical transmission system, the signal-to-noise ratio of the sub-channel signals is thus dependent on the chromatic dispersion and the frequency responses of the transmitter and receiver devices.

It is therefore an object of the present invention to provide a method to improve the transmission of an optical DMT transmit signal over an optical transmission line, especially to increase the OSNR tolerance, without costly modifications within the optical link or costly modifications of the optical transmitter device or the optical receiver device. It is a further object to provide an appropriate optical transmitter device and an appropriate optical transmitter and receiver device.

SUMMARY OF THE INVENTION

The invention achieves these objects by providing a method for creating an optical transmit signal, namely, an optical DMT transmit signal, and an appropriate optical transmitter device as well as an optical transmitter and receiver.

According to the method of the invention, it is proposed to filter an optical signal that is created by amplitude modulating the intensity of an optical carrier signal using an electrical DMT signal in such a way that one sideband of the optical spectrum of the optical DMT transmit signal is at least partly suppressed. The optical single-sideband (SSB) or vestigial sideband (VSB) transmit signal created in this way still carries the full information included in the electrical DMT modulation signal but requires less optical bandwidth and reveals an increased chromatic dispersion tolerance than an optical DSB transmit signal.

Of course, this method may not only be applied to single channel optical transmission systems but also optical WDM transmission system, wherein each optical channel signal is created as an optical SSB or VSB transmit signal.

According to a preferred embodiment, the optical bandpass filtering is effected in such a way that the optical transmit signal is a vestigial sideband signal. In this way, the filtering does not require a filter curve (i.e. a frequency response) having a sharp and exactly positioned decay. In order to achieve the advantage of a bandwidth-reduced and less dispersion sensitive optical transmit signal, it is sufficient to suppress one of the optical sidebands to a major extent. For example, at least 50 percent, preferably at least 75 percent, of the bandwidth covered by the respective sideband (corresponding to the bandwidth of the electrical discrete multi-tone signal) should be attenuated, i.e. suppressed, to a sufficient extent.

For this purpose, an optical bandpass filter may be used for bandpass filtering the optical transmit signal, the optical bandpass filter having a frequency response, which reveals a rather slow decay or filter roll-off in the direction of decreasing optical frequencies in order to partly suppress the lower sideband, wherein the decay starts at an optical frequency essentially less than or equal to the center frequency of the optical carrier signal, or which reveals a rather slow decay or filter roll-off in the direction of increasing optical frequencies in order to partly suppress the higher sideband, wherein the decay starts at an optical frequency essentially greater than or equal to the center frequency of the optical carrier signal.

In this context, the definition of a "rather slow" decay is to be understood as a contrast to an ideal or quasi-ideal sharp edge (i.e. an infinitely steep decay) of the filter curve, i.e. the filter frequency response.

Even a partial suppression of one of the two optical sidebands, i.e. using a VSB optical DMT transmit signal, is sufficient in order to drastically reduce the optical bandwidth required by the optical transmit signal and to decrease the sensitivity versus (chromatic) dispersion thereof.

In an optical WDM transmission system using such optical SSB or VSB transmit signals as optical channel signals, an optical multiplexer device having a bandpass filter characteristic with respect to each optical channel (e.g. an arrayed waveguide grating (AWG)) may simultaneously be used for bandpass filtering optical DSB channel signals (each of which is modulated according to a respective electrical DMT signal) in order to create a respective optical SSB or VSB channel transmit signal and a respective optical WDM transmit signal. The channel grid which has been defined and which is used for the optical WDM system may, of course, remain the same (e.g. one of the standardized channel grids using a 100 GHz, 50 GHz or 25 GHz channel spacing may be used). However, as compared to the transmission of conventional DSB channel signals in such optical WDM systems, the optical center frequencies of the optical SSB or VSB channel transmit signals (i.e. the optical carrier frequencies) must be shifted by such an amount in the respective direction that the desired sideband is partly or fully suppressed.

Of course, also in optical WDM systems, separate optical filters in each optical channel may be used for filtering of the optical DSB channel signals in order to create the desired optical SSB or VSB transmit signals.

According to a further preferred embodiment of the invention, the optical filtering is effected in such a way that the optical frequency components of the fully transmitted optical sideband remote from the optical carrier are attenuated less than optical frequencies components closer to the optical carrier in order to pre-emphasize the higher frequency components of the modulating signal according to a predetermined optical pre-emphasis filter function.

By applying such an optical pre-emphasis the higher frequencies of the RF signal, i.e. the DMT signal, are attenuated less than the lower frequencies. This leads to a more uniform bit allocation over the (baseband) spectrum of the DMT signal and therefore to a higher data rate for a given optical signal-to-noise ratio (OSNR), or a lower OSNR requirement for transmitting the same data rate.

This additional pre-emphasis filtering can be effected with the same filter device that is used for filtering the optical DSB signal in order to create the optical SSB or VSB transmit signal. In an optical WDM system, the optical multiplexer device or separate optical filters may be used to create the optical SSB or VSB channel transmit signals including the pre-emphasis of each or selected channels.

The filtering can be performed in a variable filter (e.g. wave shaper) or in a fixed filter, e.g. a periodic sampled grating. In general, in an optical WDM system, the creation of optical SSB or VSB channel signals with pre-emphasis is easier by using a separate optical bandpass filter having a frequency response that appropriately pre-emphasizes the desired frequency range. However, manufacturing and using a suitable periodic filter (even a periodic filter having differing pre-emphasis properties for individual channels) is not excluded, also in form of an optical multiplexer device having corresponding bandpass filtering and pre-emphasis properties.

A controllable variable optical filter may also be used in order to create the optical SSB or VSB transmit signal independently of simultaneously effecting an optical pre-emphasis of the signal. In this case, the bandwidth and/or the position (the center frequency of the filter band) may be controllable, only, wherein the transmissivity is approximately constant within the pass band.

If a fixed filter (single channel filter or periodic filter for filtering a WDM signal) is used for suppressing at least a relevant portion of an optical sideband and/or effecting an optical pre-emphasis, a typical (as required periodic) filter function is ascribed into the grating to suppress one side band and to pre-emphasize the higher frequencies, depending on a characterization of a transmitter receiver pair of a commercial transponder.

According to an embodiment of the invention, the optical bandpass filtering may be effected in such a way that the influence of a known transfer function of a transmitter device configured to create the optical transmit signal and/or a known transfer function of a receiver device configured to receive the optical transmit signal is at least partially compensated. Ideally, the transfer function(s) are fully compensated so that the DMT signal received is not at all or only marginally distorted over the whole frequency range of interest.

The optical bandpass filtering may also be effected in such a way that the signal-to-noise ratio is measured for all or at least part of the electrical partial signals received (i.e. the signal-to-noise ratio is measured for all or at least part of the sub-channels of the DMT signals, wherein each electrical partial signal consists of a sub-carrier at predetermined sub-carrier frequency which is modulated according to a dedicated modulation scheme, so that a dedicated portion of the digital input data is included in each sub-channel) and that the signal-to-noise ratios measured are used to design the optical pre-emphasis filter function. That is, the SNR of the partial signals is used as a measure for estimating the course of the frequency response of the whole transmission link, i.e. the transmitter and receiver devices and the mere optical link.

The compensation of a known or measured frequency response of a transmitter and/or receiver device (especially a known low-pass transfer function of a transmitter and/or receiver device) can rather simply be implemented by using a variable filter for creating a respective pre-emphasized optical SSB or VSB transmit signal, wherein this information is used to appropriately adjust the filter properties (i.e. the filter frequency response) of the optical filter.

Often, a transceiver device for creating and transmitting and for receiving optical DMT signals is configured to measure the signal-to-noise ratios of the electrical DMT signal received and use this information for the bit allocation in the DMT algorithm. If the transceiver device allows access to the measured signal-to-noise ratio, this information can be used to design the pre-emphasis filter. If a variable optical filter is used, this information can be transmitted to the opposite end of the transmission link in order to appropriately design the variable optical filter that is used for creating the respective pre-emphasized optical SSB or VSB transmit signal.

According to an embodiment of the invention, the signal-to-noise ratios may be measured at a second end of a bidirectional transmission link and used to design an optical pre-emphasis filter function which is used for creating a pre-emphasized optical transmit signal to be transmitted in the transmission direction to a first end of the bidirectional transmission link. That is, a symmetric transmission link is assumed, so that the same pre-emphasis may be used for both transmission directions.

In practice, this assumption of often justified as components for realizing transmitter and receiver devices are usually specified to match predetermined specifications and rather strict tolerances. Thus, the transmitter and receiver devices exhibit similar transfer functions.

BRIEF DESCRIPTION OF THE DRAWINGS

Further objects and advantages of the present invention will become apparent from the following description of a preferred embodiment that is given by way of example with reference to the accompanying drawings, wherein.

DETAILED DESCRIPTION OF THE INVENTION

Figure 1:
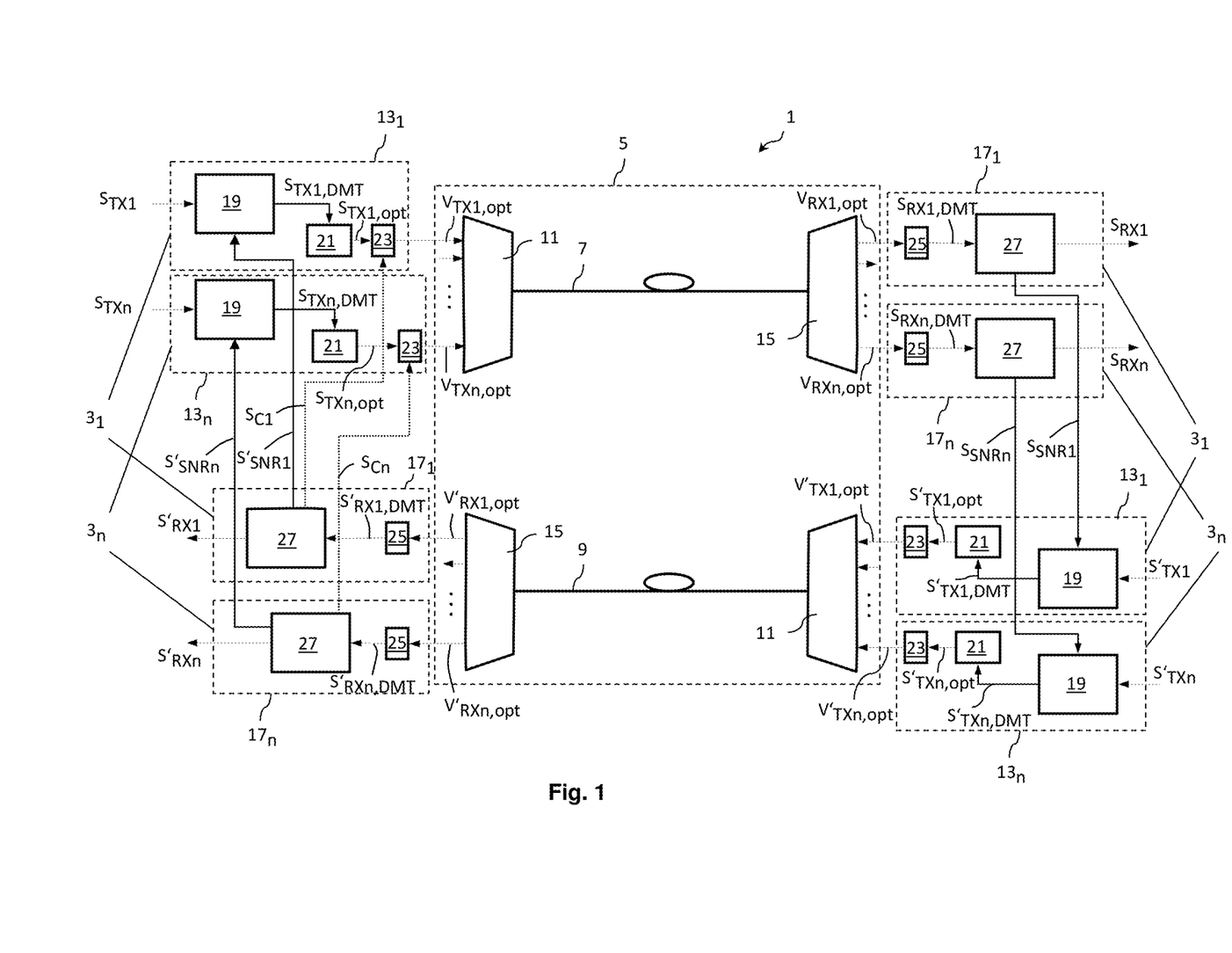
FIG. 1 shows a schematic block diagram of an embodiment of an optical WDM transmission system according to the invention.

FIG. 1 shows a schematic block diagram of an optical WDM transmission system 1. For each optical channel, the optical WDM transmission system 1 comprises a transceiver device $3_i$ (1≤i≤n) at each end of an optical link 5. In the embodiment shown, the optical link 5 consists of two separate optical links, namely, a first optical link for a downstream transmission direction and a second optical link for an upstream transmission direction (in this description, the terms "downstream" and "upstream" are arbitrarily used in order to designate a given transmission direction without specifying any preference, especially with respect to the data rate, wherein "downstream" designates a transmission from left to right in FIG. 1 and "upstream" designates a transmission in the opposite direction). The first optical link comprises an optical fiber 7, a multiplexer device 11 connected, with a WDM port, to a near end of the optical fiber 7 and a demultiplexer device 15 connected, with a WDM port, to a far end of the optical fiber 7. Likewise, the second optical link comprises an optical fiber 9, a multiplexer device 11 connected, with a WDM port, to a near end of the optical fiber 9 and a demultiplexer device 15 connected, with a WDM port, to a far end of the optical fiber 9. Each transceiver device $3_i$ comprises a transmitter device $13_i$ (1≤i≤n) configured to create an optical channel transmit signal $V_{TXi,opt}$ that is supplied to a dedicated channel port of the respective multiplexer device 11. Further, each transceiver device $3_i$ comprises a receiver device $17_i$ (1≤i≤n) configured to receive an optical channel receive signal $V_{RXi,opt}$ that is output at a dedicated channel port of the respective demultiplexer device 15.

The optical fibers 7, 9 may be standard single-mode fibers (SSMF) having usual chromatic dispersion properties (the chromatic dispersion in the 1550 nm window of an SSMF is approximately 17 ps/nm/km).

The multiplexer devices 11 and demultiplexer devices 15 of the downstream and upstream optical link may, for example, be realized as 1×n arrayed waveguide gratings (AWG).

Of course, instead of two separate optical fibers 7, 9 a single optical fiber and a single multiplexer/demultiplexer device provided at each end of the optical fiber may be used to establish the optical link 5. In such an embodiment, the optical signals for both transmission directions are transmitted over the single optical fiber. The multiplexer/demultiplexer devices may be realized as cyclic AWGs so that non-overlapping optical bands of different orders of the cyclic AWG may be used to multiplex and de-multiplex downstream and upstream optical channels signals lying in respective different optical bands.

Each optical transmitter device $13_i$ comprises a DMT transmitter section 19 configured to receive digital input data $S_{TXi}$ (1≤i≤n) carrying the information to be transmitted (either in the form of an incoming digital signal or pure digital information produced by a data processing device) and to create an electrical DMT channel transmit signal $S_{TXi,DMT}$ (1≤i≤n) to be transmitted using a given number of predetermined (electrical) carrier frequencies. As creating DMT signals is a widely known technique and the specific method to create the DMT channel transmit signals $S_{TXi,DMT}$ does not form an essential core of the present invention, further detailed explanations in this respect are omitted. It shall, however, be mentioned that discrete fast Fourier transform algorithms are often used in order to create a DMT signal, which are implemented by software or firmware and suitable hardware. Thus, a digital-to-analog (DA) converter is required in order to create an electrical DMT channel transmit signal $S_{TXi,DMT}$, which, in practice, has a limited bandwidth.

In order to simplify the description of the system in FIG. 1, the signal transmission in the downstream direction (i.e. in the direction from left to right in FIG. 1) is described only. The signal transmission in the upstream direction is effected in the same way (unless specified otherwise), wherein the reference numerals of similar signals differ by an inverted comma added to the upstream signals.

Of course, the DMT transmitter section 19 may be configured to determine the modulation scheme that is used in each sub-channel of the DMT channel transmit signal $S_{TXi,DMT}$, i.e. the set of constellation points used to create the electrical partial signals of the DMT signal by modulating the respective (electrical) sub-carrier signal having a predetermined sub-carrier frequency. In particular, the DMT transmitter section 19 may be configured to select the modulation scheme of the sub-channels depending on the signal-to-noise ratio (SNR) of the respective electrical partial signal of the electrical DMT (channel) receive signal $S_{RXi,DMT}$ which is received at the downstream end of the optical link 5. The higher the SNR, the higher the number of constellation points of the respective modulation scheme may be (i.e. the higher the number of bits assigned to a modulation symbol may be) if a given bit error rate shall be guaranteed.

Figure 2:
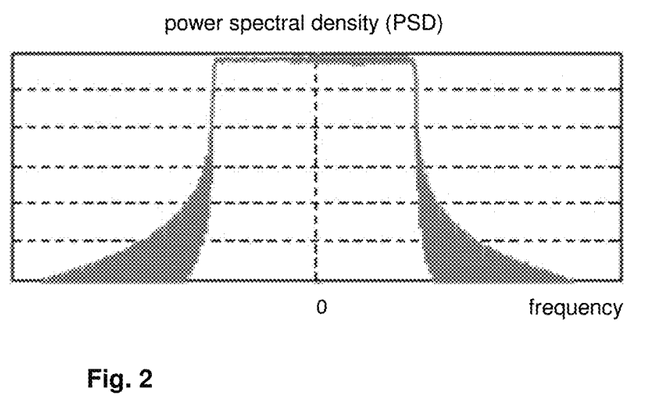
FIG. 2 shows an exemplary spectrum of an electrical DMT signal, which could be used as a modulation signal in case of an ideal transmission channel.

The power spectral density (PSD) of an ideal DMT signal using the same modulation scheme in all sub-channels is shown in FIG. 2. Such an ideal DMT signal would be used in case of an ideal transmission channel with no bandwidth limitation and with no or white noise added to the transmission channel. As apparent from FIG. 2, the spectral efficiency is excellent as the frequency-dependent power is almost homogeneously distributed over the main central portion of the bandwidth. Thus, the bandwidth of an optical channel defined in a transmission system can efficiently be used by using an optical DMT signal, i.e. an optical signal which is created by modulating the intensity of an optical carrier signal according to an electrical DMT signal.

The electrical DMT signal $S_{TXi,DMT}$ created by the DMT transmitter section 19 is supplied to a conventional modulated optical source 21 that is configured to create an intensity-modulated optical signal $S_{TXi,opt}$ using the electrical DMT signal $S_{TXi,DMT}$ as a modulation signal. The modulated optical source may, for example, be realized as a directly modulated laser diode or as a CW laser diode in combination with an external optical modulator.

The conventional optical source 21 creates an intensity-modulated signal $S_{TXi,opt}$, which is a DSB optical signal, wherein the information of the modulation signal, i.e. the electrical DMT signal $S_{TXi,DMT}$, is included in each of the sidebands left and right of the optical frequency of the optical carrier.

This optical DSB signal $S_{TXi,opt}$ is supplied to an optical filter device 23 which is configured to at least partially suppress one of the two optical sidebands of the signal $S_{TXi,opt}$. Thus, the signal $V_{TXi,opt}$ output by the optical filter device 23 is an SSB or VSB optical signal, which still carries the full information of the modulation signal $S_{TXi,DMT}$ in its non-suppressed sideband. Due to the at least partial suppression of one of the sidebands, the chromatic dispersion tolerance when transmitting the signal over an optical link having a predetermined chromatic dispersion is increased.

In the following, the SSB or VSB optical signals are referred to as VSB signal if not clarified otherwise.

Each of the optical VSB channel transmit signals $V_{TXi,opt}$ is supplied to a dedicated channel port of the multiplexer device 11, which combines the single channel signals to a respective optical WDM transmit signal. The optical WDM transmit signal is output at the WDM port of the multiplexer device 11, transmitted over the downstream optical fiber 7 and received as an optical WDM receive signal at the remote end of the optical fiber 7. The optical WDM receive signal is demultiplexed into optical receive channel signals $V_{RXi,opt}$ by the optical demultiplexer device 15 coupled, at a WDM port, to the remote end of the optical fiber 7. Each of the single demultiplexed optical VSB channel receive signals $V_{RXi,opt}$ is supplied to a respective optical receiver 25 configured to convert the respective optical VSB channel receive signal $V_{RXi,opt}$ into an electrical DMT channel receive signal $S_{RXi,DMT}$.

Each electrical DMT channel receive signal $S_{RXi,DMT}$ is supplied to a DMT receiver section 27 configured to demodulate the respective DMT channel receive signal $S_{RXi,DMT}$ into digital output data $S_{RXi}$, wherein these data may of course be output as a respective high-bit-rate signal or as pure digital data independent of a given time dependency or bit rate.

The DMT receiver section 27 of all or selected channels may be configured to determine the SNR of the electrical partial signals comprised by the respective electrical DMT channel receive signal $S_{RXi,DMT}$. As already mentioned above, this SNR information may be used by the respective transmitter device $13_i$ (which creates the respective optical channel VSB transmit signal $V_{TX,iopt}$) as a measure for allocating a suitable modulation scheme to the sub-channels of the respective electrical DMT channel transmit signal $S_{TXi,DMT}$.

If a symmetric transmission link can be assumed, this information may also be used by the transmitter device $13_i$ of the same transceiver device $3_i$, i.e. the respective electrical DMT channel transmit signal $S'_{TXi,DMT}$ for creating the optical channel VSB transmit signal $V'_{TX,iopt}$ that is transmitted in the upstream direction is created by using the SNR information detected by the receiver device $17_i$ of the same transceiver device $3_i$.

As shown in FIG. 1, the SNR information detected by a DMT receiver section 27 of a receiver device $17_i$ is supplied to the transmitter device $13_i$ of the respective transceiver device $3_i$ as an SNR information signal $S_{SNRi}$. This information may be transmitted to the respective receiver device $17_i$ at the upstream end within a specified sub-channel of the respective electrical DMT channel transmit signal $S'_{TXi,DMT}$, which serves as a control channel. At the upstream end of the transmission link 5, the respective receiver device $17_i$ extracts the SNR information from the optical channel VSB receive signal $V'_{RX,iopt}$ and supplies this information, included in an SNR information signal $S'_{SNRi}$, to the respective DMT transmitter section 19, which uses this information for the bit-allocation algorithm used to create the respective electrical DMT channel transmit signal $S_{TXi,DMT}$.

Of course, the DMT receiver section 27 at this upstream end of the optical link 5 may also be configured to detect an SNR information of the electrical DMT channel receive signal $S'_{RXi,DMT}$ and to supply this information to the respective DMT transmitter section 19 in order to transmit this information to the downstream end of the transmission link. Thus, the SNR information signals $S'_{SNRi}$ and $S_{SNRi}$ may include both SNR information that is detected by the respective DMT receiver section 27 for the partial signals of the electrical DMT channel receive signal $S'_{RXi,DMT}$ and SNR information that is included in the respective control channel of this signal. Of course, this different information could be supplied from the respective DMT receiver section 27 to the respective DMT transmitter section 19 using two separate signals and/or signal paths.

If, in case of a symmetric transmission link, the SNR information detected at an end of the transmission link is used for the bit-allocation algorithm used in the DMT transmitter section 19 at the respective same end, which embodiment is also covered by FIG. 1, the signals $S'_{SNRi}$ and $S_{SNRi}$ only include the respective SNR information that has been detected by the respective DMT receiver section 27.

As shown in FIG. 1, all or selected optical filter devices may be realized as variable optical filter devices, wherein the filter characteristic, i.e. especially the wavelength-dependent transmissivity of the filter device 23, can be controlled depending on a filter control information. The SNR "spectrum" of the electrical DMT channel receive signal $S'_{RXi,DMT}$, i.e. the SNR values of the partial signals of the DMT signal at the respective electrical carrier frequencies, may also be used as a measure for the (electrical) frequency responses of the transmitter device $13_i$ and the receiver device $17_i$ of a transmission link. Thus, this SNR information may also be used in order to determine a pre-emphasis of the respective signal components. If, for example, the bandwidth of the DA converter in the DMT transmitter section 19, the bandwidth of the modulated optical source 21, the bandwidth of the optical receiver 25 or the bandwidth of the AD converter of the DMT receiver section 19 limits the spectra of the respective signals at higher (RF) frequencies, this frequency range may be pre-emphasized. According to the present invention, this pre-emphasis is effected in the optical domain by using an optical filter device 23 having an appropriate filter function or optical transmissivity, respectively.

A filter control signal $S_{Ci}$ comprising the filter control information may be created by the DMT receiver section 27, which receives the respective SNR information from the opposite end of the transmission link or, if a symmetric transmission link can be assumed, creates the SNR information from the respective electrical DMT channel receive signal $S_{RXi,DMT}$. This filter control signal $S_{Ci}$ is supplied to the respective variable optical filter device, which uses this information in order to adjust the filter properties accordingly. Of course, merely the SNR information could be supplied to the variable optical filter device 23 and the filter device 23 could be configured to create the filter control information (e.g. filter parameters) from the SNR information received.

In the embodiment shown in FIG. 1, for explanatory purposes, the optical filter devices 23 comprised by the transmitter devices $13_i$ provided at the upstream end of the optical link 5 are realized as variable filters only, whereas the optical filter devices 23 of the transmitter devices $13_i$ at the downstream end are fixed filters.

Apart from effecting an optical pre-emphasis by controlling the frequency-dependent course of the transmissivity of the filter device 23, also the position of the pass band may be controllable in order to suppress a desired portion of the sideband of the respective intensity-modulated optical channel transmit signal $S_{TXi,opt}$. Also, the position of the pass band influences the SNR due to the chromatic dispersion sensitivity of dual-sideband optical signals (see below).

Of course, instead of using a variable optical filter device 23, a fixed filter device 23 may be used in order to create a pre-emphasized optical channel transmit signal $V_{TXi,opt}$.

Using a single optical filter in order to realize the optical filter device 23 for creating a VSB optical transmit signal which is additionally pre-emphasized in a desired manner reduces the number of components and costs for realizing the transmitter and receiver devices $13_i$, $17_i$. Using an electrical DMT channel transmit signal as a modulating signal for an optical (channel) carrier signal and creating an SSB or VSB signal by filtering the intensity-modulated optical (channel) DSB transmit signal $S_{TXi,opt}$ in order to create an SSB or VST optical (channel) VSB transmit signal $V_{TXi,opt}$ leads to an optimized use of the optical bandwidth provided by the optical link 5 for the transmission of the optical WDM signal or the optical channel signal, respectively, and to an increase in the chromatic dispersion tolerance.

Pre-emphasizing the optical channel signals to be transmitted over the optical link 5, i.e. a pre-compensation in the optical domain, avoids any reduction of the resolution during a digital-to-analog conversion in the process of creating a DMT signal as would be caused by applying a pre-compensation of bandwidth limitation (caused by a limited bandwidth of a DA converter) in the electrical digital domain.

In the following, the method and advantages of using a pre-emphasized optical (channel) signal created by using an electrical DMT signal as modulating signal for modulating the intensity of an optical carrier signal as an optical transmit signal will be explained in greater detail.

As explained above, the (ideal) electrical DMT channel transmit signal would be created using the same modulation scheme, for example a $2^n$ QAM scheme, for all subchannels. However, this would only be reasonable in case of an ideal transmission channel without bandwidth limitation and noise. In reality, however, channel bandwidth limitations apply, especially caused by the electronic components and electro-optical or opto-electrical converters provided in the transmitter device $13_i$ and the receiver device $17_i$. Moreover, noise added to the transmission link (which comprises the optical link 5 and the respective transmitter and receiver devices $13_i$, $17_i$) leads to a deterioration of its transmission properties, which can be assessed by the SNR.

Figure 3:
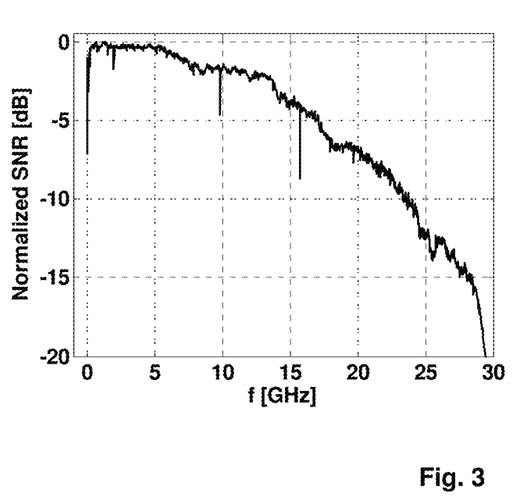
FIG. 3 shows an exemplary normalized signal-to-noise ratio "spectrum" (i.e. the SNR of the partial signals) of a DMT signal measured at a receiver device of an optical transmission link with negligible chromatic dispersion.

FIG. 3 shows an exemplary normalized signal-to-noise ratio "spectrum" of an electrical DMT channel receive signal $S_{RXi,DMT}$ measured at a receiver device $17_i$ of an optical transmission link similar to FIG. 1 with negligible chromatic dispersion of the optical link 5 (e.g. the optical link may be sufficiently short or comprise compensation means for sufficiently reducing the chromatic dispersion). The SNR for all of the plurality of subchannels at respective discrete sub-carrier frequencies in the frequency range between 20 MHz and 30 GHz is shown. The roll-off of the normalized SNR for higher frequencies is caused by bandwidth limitations of the transmitter and receiver devices $13_i$ and $17_i$. Contrary to the system in FIG. 1, no optical filter devices have been used for converting the intensity-modulated optical (channel) transmit signal $S_{TXi,opt}$ into an optical SSB or VSB signal. Thus, FIG. 3 shows the SNR "spectrum" in case of using an optical DSB signal for transporting the information of an electrical DMT channel transmit signal $S_{RXi,DMT}$. As the optical link reveals no chromatic dispersion, no power fading can be observed in FIG. 3. Merely other influences, e.g. noise, lead to an SNR reduction in certain sub-channels (see the peaks in the regions of 2 GHz, 10 GHz and 16 GHz).

Figure 4A:
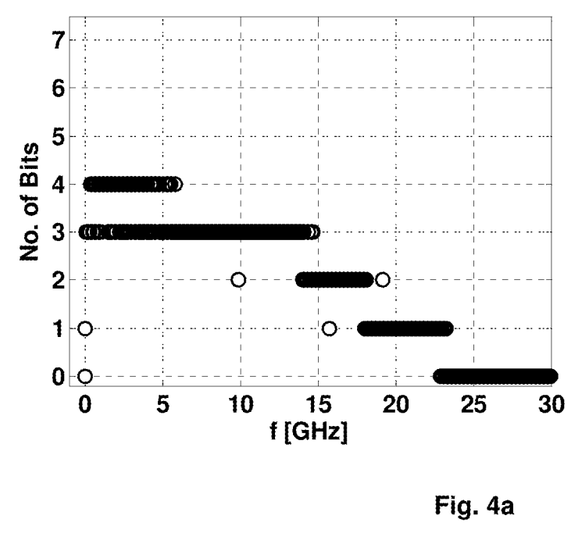
FIGS. 4a and 4b show the number of bits allocated to the sub-channels of an electrical DMT signal transmitted over an optical transmission link characterized by the SNR "spectrum" of FIG. 3 in case of an optical DSB transmit signal having a total bit rate of 56 Gb/s (FIG. 4a) and 112 Gb/s (FIG. 4b), respectively.
Figure 4B:
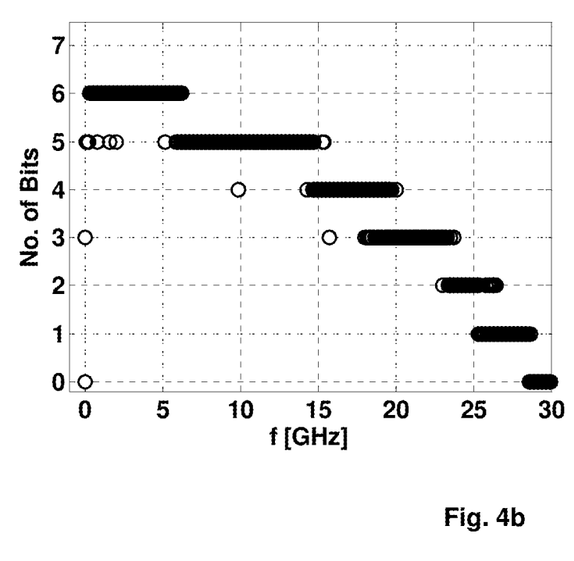

FIGS. 4a and 4b show the number of bits assigned to each modulation symbol of the modulation schemes used in the sub-channels (which are represented by the frequencies of the electrical partial signals of the DMT signal) in case of a 56 Gb/s (FIG. 4a) and 112 Gb/s (FIG. 4b) electrical DMT channel receive signal $S_{RXi,DMT}$ used as modulating signal for creating the respective optical channel VSB transmit signal $V_{TXi,opt}$. No optical pre-emphasis has been applied in this case. As apparent from these figures, the SNR values measured in the sub-channels have been used as a measure for determining the modulation scheme, i.e. the number of bits assigned to each modulation symbol, in the sub-channels: the higher the SNR in the respective sub-channel, the higher the number of bits.

Figure 5:
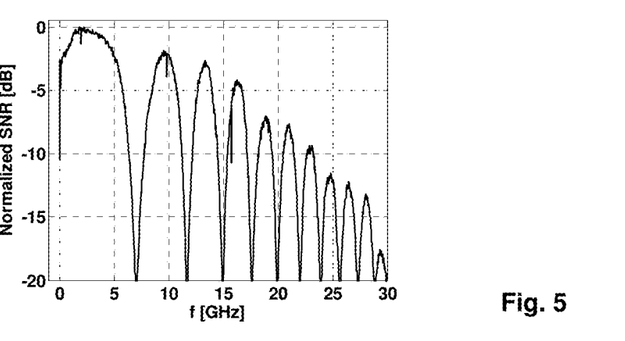
FIG. 5 shows an exemplary normalized signal-to-noise ratio "spectrum" (i.e. the SNR of the partial signals) of a DMT signal measured at a receiver device of an optical transmission link with considerable chromatic dispersion.
Figure 6A:
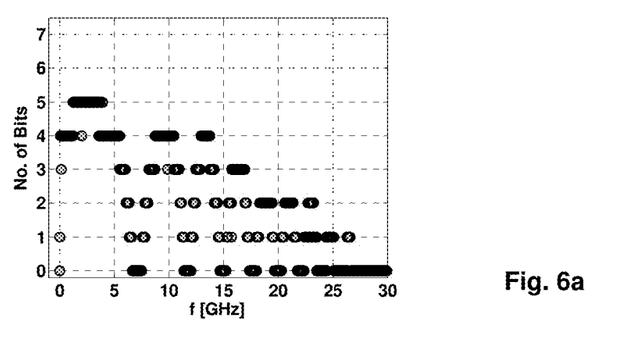
FIGS. 6a and 6b show the number of bits allocated to the sub-channels of an electrical DMT signal transmitted over an optical transmission link characterized by the SNR "spectrum" of FIG. 5 in case of an optical DSB transmit signal having a total bit rate of 56 Gb/s (FIG. 6a) and 112 Gb/s (FIG. 6b), respectively.
Figure 6B:
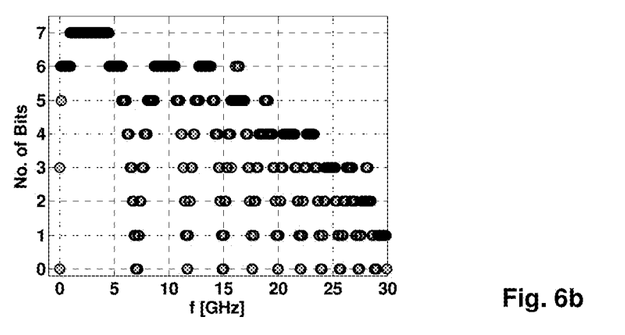

FIG. 5 shows an exemplary normalized SNR "spectrum" of the sub-channels of an electrical DMT channel receive signal $S_{RXi,DMT}$ in a scenario similar to the scenario of FIG. 3, wherein a predetermined non-negligible chromatic dispersion of the optical link 5 is assumed. As explained above and as apparent from FIG. 5, the chromatic dispersion leads to power fading and, as a result, to complete drop-outs of the transmission capacity of certain sub-channels as apparent from FIGS. 6a and 6b, which show the bit allocation of the sub-channels for a 56 Bb/s (FIG. 6a) and a 112 Gb/s (FIG. 6b) electrical DMT signal.

Figure 9:
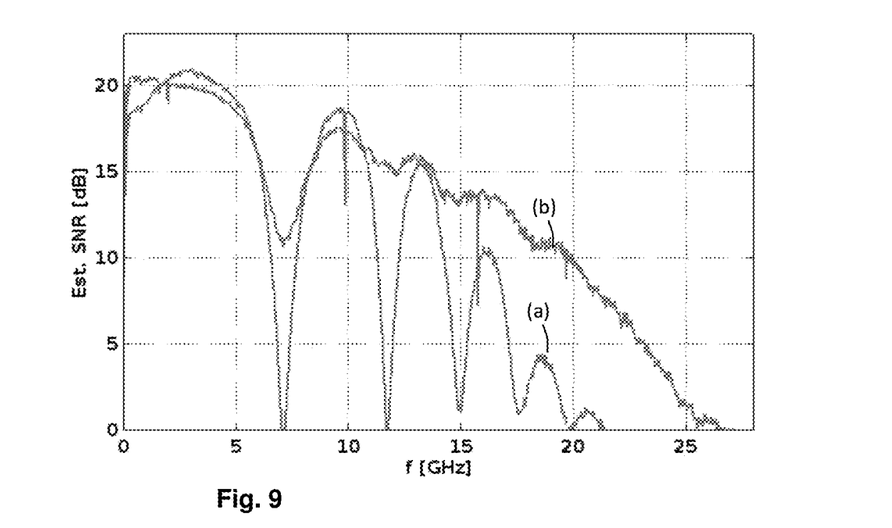
FIG. 9 shows estimated normalized signal-to-noise ratio spectra for electrical DMT signals measured at a receiver device in case of transmitting an optical DSB signal (curve (a)) and an optical VSB signal (curve (b)) over an optical transmission link with considerable chromatic dispersion.

FIG. 9 shows two curves for an estimated SNR "spectrum" of an electrical DMT receive signal $S_{RXi,DMT}$ in order to visualize the effect of using an optical VSB transmit signal $V_{TX,iopt}$ instead. Curve (a) in FIG. 9 has been measured for an optical DSB transmit signal and thus shows power fading.

Figure 7:
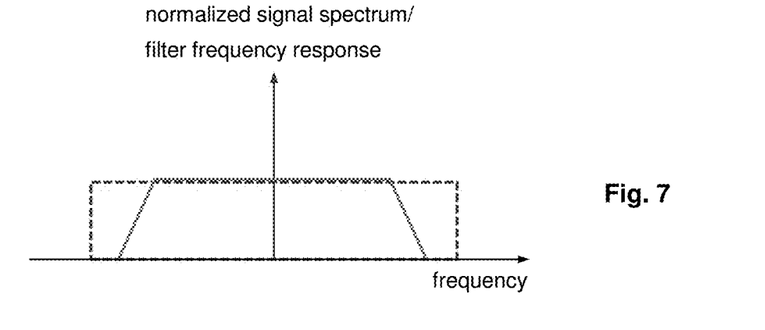
FIG. 7 shows a schematic representation of the spectrum of a optical DSB signal (dashed curve) and the filter function (frequency response) of an optical bandpass channel filter defining the center frequency and bandwidth of a predetermined optical channel, the optical carrier frequency positioned in the center of the filter bandwidth for transmitting an optical DSB signal over an optical transmission link.

Moreover, a situation as shown in FIG. 7 has been assumed, i.e. the optical spectrum of the optical DSB signal (the dashed curve in FIG. 7 represents the normalized rectangular optical spectrum of an ideal DMT signal; the arrow designates the optical carrier frequency) exceeds the bandwidth of the respective optical channel of the WDM system similar to the system in FIG. 1 (see the solid curve in FIG. 7 representing the normalized transmissivity of the optical channel). Thus, an upper frequency range of the optical DSB signal is cut off by the optical property of the optical link. This leads to a bandwidth limitation for sub-channels above approximately 22 GHz (electrical carrier frequency) as apparent from FIG. 9.

Figure 8:
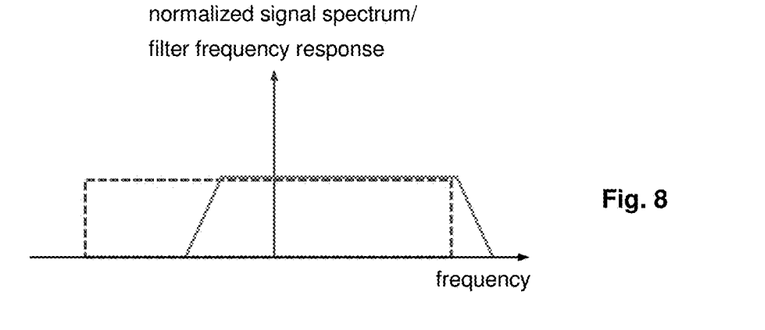
FIG. 8 shows a representation similar to FIG. 7, wherein the optical DSB signal spectrum (dashed curve) and the filter function are shifted relative to each other for converting the optical DSB signal into an optical VSB.

Curve (b) in FIG. 9 has been measured for an optical VSB transmit signal and thus shows a drastically reduced power fading effect. Especially in the frequency range above 8 GHz almost no power fading occurs. Even the first drop-out at approximately 7 GHz is extremely reduced. This is caused by the nature of the optical VSB transmit signal, which will now be explained with reference to FIG. 8. As in FIG. 7, the dashed curve in FIG. 8 represents the optical spectrum of the intensity-modulated optical DSB signal and the solid curve represents the transmissivity of the optical channel. As apparent from FIG. 8, by shifting the signal spectrum and the channel pass band relative to each other (e.g. by using a tunable laser that is modulated according to an electrical DMT signal), a relevant portion of one of the two optical sidebands (in the example according to FIG. 8, the lower sideband) is suppressed. This leads to the increase in chromatic dispersion tolerance apparent from FIG. 9. Further, the higher frequency range of the non-suppressed band is now lying within the channel bandwidth and is therefore transmitted. This explains the course of curve (b) in FIG. 9, which shows a roll-off that is clearly above curve (a).

Of course, in order to convert the optical DSB transmit signal into a VSB (or even SSB) signal, a separate optical filter as the filter device 23 in FIG. 1 may be used. However, also the respective multiplexer device 11 may have appropriate filter properties.

As apparent from FIG. 9, the optical sideband should be sufficiently suppressed at least for optical frequencies which are equal to or lower (if the lower sideband is suppressed) or equal to or higher (if the upper sideband is suppressed) than the optical frequency at which the first drop-out in the signal received occurs depending on the chromatic dispersion of the optical link 5.

Figures 10, 11:
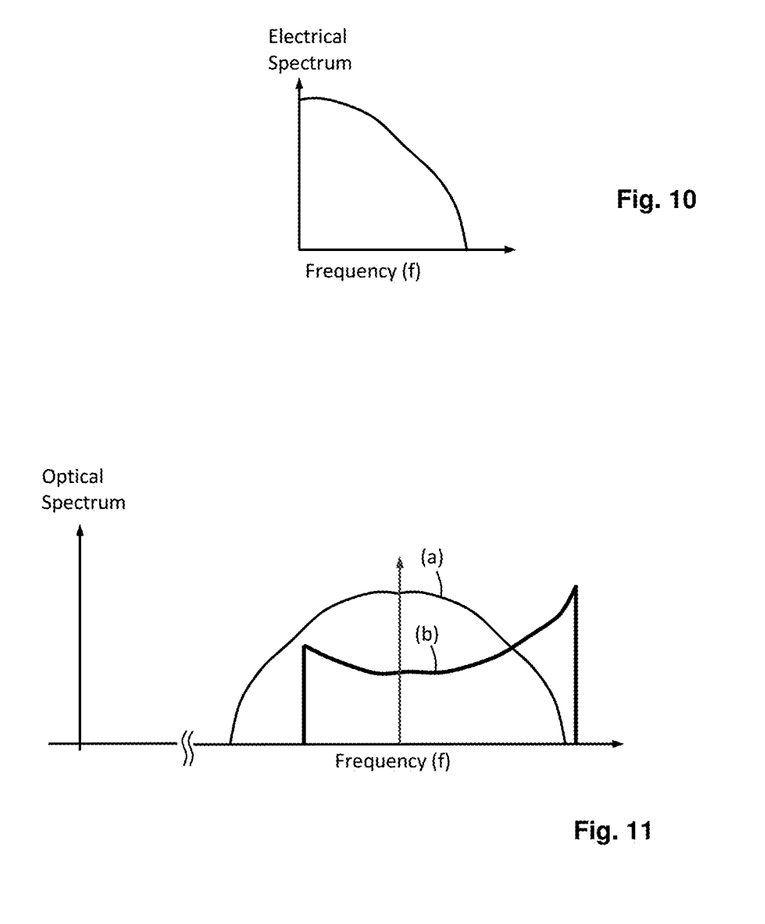
FIG. 10 schematically shows an electrical spectrum of an electrical modulation signal, e.g. an electrical DMT signal, to be transmitted over an optical transmission link by modulating the intensity of an optical carrier signal.
FIG. 11 schematically shows the optical spectrum of an optical DSB signal (curve (a)) created by modulating the intensity of an optical carrier signal using the electrical modulation signal in FIG. 10 and a filter function of an optical bandpass and pre-emphasis filter (curve (b)) for converting the optical DSB signal into an optical pre-emphasized VSB transmit signal.
Figure 12:
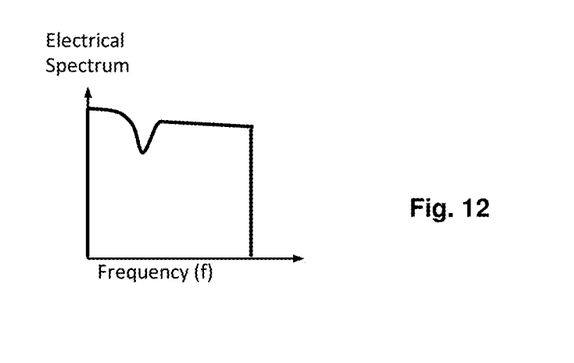
FIG. 12 schematically shows the electrical spectrum of the electrical signal received after having demodulated the optical pre-emphasized VSB transmit signal created according to FIG. 11.

FIGS. 10 to 12 schematically visualize the effect of an optical pre-emphasis of the optical VSB channel transmit signals that can be implemented in the system of FIG. 1. FIG. 10 schematically shows the electrical spectrum of a DMT transmit signal that is used for modulating an optical source 21. FIG. 11 shows the optical spectrum of a respective intensity-modulated optical channel transmit signal (curve a)), wherein the arrow represents the optical carrier frequency. Curve (b) in FIG. 11 represents the transmissivity of an optical filter (like the filter device 23 in FIG. 1), which attenuates the optical frequencies remote from the optical carrier frequency less than the optical frequencies closer to the optical carrier frequency. As a result, the SNR of the sub-channels of the DMT receive signal at higher (RF) frequencies is increased. FIG. 12 schematically shows the electrical spectrum of a DMT receive signal that has been transmitted by using an optical VSB signal and additionally applying an optical pre-emphasis. As apparent from FIG. 12, the decrease in the range of the first drop-out caused by chromatic dispersion still exists (see FIG. 9), while the decay at higher frequencies is compensated to a large extent. It is of course desirable to design the course of the optical pre-emphasis in such a manner that the course of the frequency response of the transmitter device $13_i$ and the frequency response of the receiver device $17_i$ is compensated to the greatest extent possible. However, even a partial compensation can drastically improve the performance of a respective transmission link.

Thus, the invention provides a method for creating an optical DMT transmission signal which makes it possible to more efficiently use the optical bandwidth provided by an optical link and to increase the chromatic dispersion tolerance by suppressing at least a relevant portion of one of the optical sidebands of an optical DSB transmit signal. By additionally applying an optical pre-emphasis, commercial DMT transmitters may be used and operated beyond their specified operation ranges.

LIST OF REFERENCE SIGNS 1 optical WDM transmission system
$3_i$ transceiver device ($1n$)
5 optical link
7 optical fiber
9 optical fiber
11 multiplexer device ($1n$)
$13_i$ transmitter device
15 demultiplexer device
$17_i$ receiver device (1
19 DMT transmitter section
21 modulated optical source
23 optical filter device
25 optical receiver 27 DMT receiver section
$S_{Ci}$ control signal (1≤i≤n)
$S_{TXi}$ digital input data (1≤i≤n)
$S_{RXi}$ digital output data (1≤i≤n)
$S_{TXi,DMT}$ electrical DMT (channel) transmit signal (1≤i≤n)
$S_{RXi,DMT}$ electrical DMT (channel) receive signal (1≤i≤n)
$S_{TXi,opt}$ intensity-modulated optical (channel) transmit signal (1≤i≤n)
$S_{SNRi}$ SNR information signal (1≤i≤n)
$V_{TX,iopt}$ optical (channel) VSB transmit signal (1≤i≤n)
$V_{RXi,opt}$ optical (channel) VSB receive signal (1≤i≤n)
$S'_{Ci}$ control signal (1≤i≤n)
$S'_{TXi}$ digital input data (1≤i≤n)
$S'_{RXi}$ digital output data (1≤i≤n)
$S'_{TXi,DMT}$ electrical DMT (channel) transmit signal (1≤i≤n)
$S'_{RXi,DMT}$ electrical DMT (channel) receive signal (1≤i≤n)
$S'_{TXi,opt}$ intensity-modulated optical (channel) transmit signal (1≤i≤n)
$S'_{SNRi}$ SNR information signal (1≤i≤n)
$V'_{TX,iopt}$ optical (channel) VSB transmit signal (1≤i≤n)
$V'_{RXi,opt}$ optical (channel) VSB receive signal (1≤i≤n)

The invention claimed is:

1. A method for creating an optical transmit signal comprising the steps of
   (a) creating an electrical discrete multi-tone signal according to digital input data carrying information to be transmitted, the discrete multi-tone signal comprising a plurality of electrical partial signals, each electrical partial signal defining a sub-channel, wherein each electrical partial signal consists of a sub-carrier at a predetermined sub-carrier frequency which is modulated according to a dedicated modulation scheme, so that a dedicated portion of the digital input data is included in each sub-channel,
   (b) creating an optical signal by using the electrical discrete multi-tone signal as modulating signal for amplitude-modulating intensity of an optical carrier signal, and
   (c) bandpass-filtering the optical signal in order to create an optical single sideband or vestigial sideband transmit signal,
   wherein the optical filtering is effected in such a way that the optical frequency components remote from the optical carrier are attenuated less than optical frequencies components closer to the optical carrier in order to pre-emphasize the higher frequency components of the modulating signal according to a predetermined optical pre-emphasis filter function.

2. The method according to claim 1, wherein the optical bandpass-filtering is effected in such a way that the optical transmit signal is a vestigial sideband signal,
   (a) wherein a lower optical sideband is sufficiently suppressed for optical frequencies equal to or lower than an optical frequency of a first drop-out due to a chromatic dispersion of an optical link, over which the vestigial sideband signal is to be transmitted, or
   (b) wherein an upper optical sideband is sufficiently suppressed for optical frequencies equal to or higher than the optical frequency of the first drop-out due to a chromatic dispersion of an optical link, over which the vestigial sideband signal is to be transmitted.

3. The method according to claim 2, wherein an optical bandpass filter device is used for bandpass-filtering the optical transmit signal, the optical bandpass filter device having a frequency response
   (a) which reveals a non-step-like decay in a direction of decreasing optical frequencies in order to partly suppress the lower sideband, wherein the decay starts at an optical frequency essentially less than or equal to a center frequency of the optical carrier signal, or
   (b) which reveals a rather slow decay in the direction of increasing optical frequencies in order to partly suppress the higher sideband, wherein the decay starts at an optical frequency essentially greater than or equal to the center frequency of the optical carrier signal.

4. The method according to claim 1, wherein optical bandpass-filtering is effected in such a way that the influence of a known transfer function of a transmitter device configured to create the optical transmit signal and/or a known transfer function of a receiver device configured to receive the optical transmit signal as an optical receive signal is at least partially compensated.

5. The method according to claim 1, wherein optical bandpass-filtering is effected depending on a signal-to-noise ratio of the electrical partial signals of a discrete multi-tone signal received, wherein the signal-to-noise ratio of all or selected electrical partial signals of the discrete multi-tone signal received is measured and wherein the signal-to-noise ratios measured are used to design the optical pre-emphasis filter function.

6. The method according to claim 5, wherein the signal-to-noise ratios are measured at a first end of a bidirectional transmission link and used to design an optical pre-emphasis filter function which is used for creating a pre-emphasized optical transmit signal to be transmitted in a transmission direction to a second end of the bidirectional transmission link.

7. An optical transmitter device for creating an optical transmit signal comprising
   (a) an electrical transmitter device, wherein the electrical transmitter device creates an electrical discrete multi-tone signal according to digital input data carrying information to be transmitted, the discrete multi-tone signal comprising a plurality of electrical partial signals, each electrical partial signal consisting of a sub-carrier at a predetermined sub-carrier frequency which is modulated according to a dedicated modulation scheme, wherein a dedicated portion of the digital input data is included in the dedicated modulation scheme, and
   (b) a modulated optical source, wherein the modulated optical source creates an optical signal by using the electrical discrete multi-tone signal as modulating signal for amplitude-modulating an optical carrier signal,
   wherein
      an optical bandpass filter device is provided which is configured to filter the optical signal in order to create a single-sideband or vestigial sideband optical transmit signal, and
      wherein the optical bandpass filter device has a filter function adapted to attenuate optical frequency components remote from the optical carrier less than optical frequencies components closer to the optical carrier in order to pre-emphasize higher frequency components of the modulating signal.

8. The optical transmitter device according to claim 7, wherein the optical bandpass filter device reveals a filter function adapted to create a vestigial sideband optical transmit signal,
   (a) wherein the filter function reveals a non-steplike decay in a direction of decreasing optical frequencies in order to partly suppress a lower sideband, wherein the decay starts at an optical frequency essentially less than or equal to a center frequency of the optical carrier signal, or (b) wherein the filter function reveals a non-steplike decay in the direction of increasing optical frequencies in order to partly suppress a higher sideband, wherein the decay starts at an optical frequency essentially greater than or equal to the center frequency of the optical carrier signal.

9. The optical transmitter device according to claim 7, wherein the optical bandpass filter device has a filter function adapted to at least partially compensate the influence of a known transfer function of a transmitter device configured to create the optical transmit signal and/or a known transfer function of a receiver device configured to receive the optical transmit signal as an optical receive signal.

10. The optical transmitter device according to claim 7, wherein the optical bandpass filter device of the optical transmitter device is a variable optical bandpass filter device comprising a filter control unit configured to control the filter function of the variable optical bandpass filter according to a filter control information.

11. An optical transmitter and receiver device comprising an optical transmitter device according to claim 7 and an optical receiver device, the optical transmitter and receiver device being configured to be connected to a near end of an optical link, wherein (a) it comprises an optical receiver device configured to receive, as an optical receive signal, an optical single-sideband or vestigial sideband transmit signal being created by the optical transmitter device in order to create an electrical discrete multi-tone receive signal, (b) it comprises an DMT receiver section configured to receive the electrical discrete multi-tone signal and to extract digital output data contained therein, and (c) the DMT receiver section is further configured to determine a spectral signal-to-noise ratio of selected or all electrical partial signals of the electrical discrete multi-tone signal.

12. The optical transmitter and receiver device according to claim 11, wherein the optical transmitter device is configured to transmit information concerning the determined signal-to-noise ratio values or further processed information based on the determined signal-to-noise ratio values to a further optical transmitter and receiver device connected to a remote end of the optical transmission line.

13. The optical transmitter and receiver device according to claim 11, wherein the optical transmitter device comprises a variable optical bandpass filter device comprising a filter control unit, wherein the filter control unit is configured to receive the determined signal-to-noise ratio values or further processed information based on determined signal-to-noise ratio values and to control the filter function of the variable optical bandpass filter device according to this filter control information.

* * * * *